(12) United States Patent
Shin (10) Patent No.: US 11,279,246 B2
(45) Date of Patent: Mar. 22, 2022

(54) CONDUIT STRUCTURE FOR CHARGING GUN

(71) Applicant: JOONG ANG CONTROL CO., LTD., Cheongju-si (KR)

(72) Inventor: Hyeon Kyun Shin, Goyang-si (KR)

(73) Assignee: JOONG ANG CONTROL CO., LTD., Cheongsu-si (KR)

( * ) Notice: Subject to any disclaimer, the term of this patent is extended or adjusted under 35 U.S.C. 154(b) by 0 days.

(21) Appl. No.: 17/029,624

(22) Filed: Sep. 23, 2020

(65) Prior Publication Data

US 2021/0155102 A1 May 27, 2021

(30) Foreign Application Priority Data

Nov. 22, 2019 (KR) .................. 10-2019-0151545

(51) Int. Cl.
| | |
|---|---|
| *B60L 53/18* | (2019.01) |
| *B60L 53/16* | (2019.01) |
| *B60L 53/30* | (2019.01) |
| *F16L 3/015* | (2006.01) |
| *F16L 3/26* | (2006.01) |
| *H02G 3/04* | (2006.01) |
| *H02J 7/00* | (2006.01) |

(52) U.S. Cl.
CPC .............. *B60L 53/18* (2019.02); *B60L 53/16* (2019.02); *B60L 53/30* (2019.02); *F16L 3/015* (2013.01); *F16L 3/26* (2013.01); *H02G 3/0406* (2013.01); *H02J 7/0045* (2013.01)

(58) Field of Classification Search
CPC .......... B60L 53/18; B60L 53/16; B60L 53/30; F16L 3/015; F16L 3/26; H02G 3/0406; H02J 7/0045
USPC ........................................................ 320/109
See application file for complete search history.

(56) References Cited

U.S. PATENT DOCUMENTS

| | | | |
|---|---|---|---|
| 2011/0181241 A1* | 7/2011 | Badger | ................. B60L 53/665 320/109 |
| 2013/0076902 A1* | 3/2013 | Gao | ................... H01R 13/6683 348/148 |

(Continued)

FOREIGN PATENT DOCUMENTS

| | | | |
|---|---|---|---|
| CN | 106160088 A | * | 11/2016 |
| CN | 106515477 A | * | 3/2017 |

(Continued)

*Primary Examiner* — Suresh Memula
(74) *Attorney, Agent, or Firm* — Sughrue Mion, PLLC (57) ABSTRACT

The present disclosure relates to a charging gun conduit structure, including a main post erected on the ground, a first conduit rotatably attached to a top portion of the main post, an L-shaped second conduit with one end rotatably attached to an end of the first conduit and the other end extended toward the ground, a third conduit with one end attached to the second conduit through an extendable corrugated pipe, a fourth conduit with one end rotatably attached to the other end of the third conduit, a charging gun with one end connected to the other end of the fourth conduit through an elastic connection unit allowing a bending within a predetermined range at an arbitrary direction, and a plurality of charging cables with one or more signal lines disposed to be unconstrained inside the first through fourth conduits to allow easy rotation and extension of the conduit structure.

18 Claims, 12 Drawing Sheets

(56) References Cited

U.S. PATENT DOCUMENTS

2014/0340040 A1* 11/2014 Hill .................... B60L 53/35
    320/109
2015/0060611 A1* 3/2015 Takahashi ............... B60L 53/14
    248/70
2020/0369167 A1* 11/2020 Krucinski ............ B60L 53/305

FOREIGN PATENT DOCUMENTS

| | | | | |
|---|---|---|---|---|
| CN | 107388134 A | * | 11/2017 | |
| CN | 107839539 A | * | 3/2018 | |
| CN | 207128662 U | * | 3/2018 | |
| CN | 208369240 U | * | 1/2019 | |
| CN | 109398123 A | * | 3/2019 | |
| CN | 109887670 A | * | 6/2019 | |
| CN | 106536262 B | * | 7/2019 | ............ B60L 53/32 |
| CN | 209266086 U | * | 8/2019 | |
| CN | 110356272 A | * | 10/2019 | |
| CN | 111169314 A | * | 5/2020 | |
| CN | 111231711 A | * | 6/2020 | |
| CN | 111873831 A | * | 11/2020 | |
| CN | 112172569 A | * | 1/2021 | |
| CN | 112440794 A | * | 3/2021 | |
| CN | 213183715 U | * | 5/2021 | |
| DE | 102012216980 A1 | * | 4/2013 | ............ B60L 53/51 |
| DE | 102018104759 A1 | * | 9/2019 | ............ B60L 53/16 |
| DE | 102018104762 A1 | * | 9/2019 | ............ B60L 53/35 |
| DE | 202020106059 U1 | * | 3/2021 | ............ B60L 53/31 |
| EP | 3459785 A1 | * | 3/2019 | ............ B60L 53/31 |
| JP | 2015047014 A | * | 3/2015 | ............ B60L 53/14 |
| KR | 102113309 B1 | * | 5/2020 | ............... F16L 3/26 |

* cited by examiner

CONDUIT STRUCTURE FOR CHARGING GUN

CROSS-REFERENCE TO RELATED APPLICATIONS

The present application is based on and claims priority from Korean Patent Application Number 10-2019-0151545, filed Nov. 22, 2019, the disclosure of which is incorporated by reference herein in its entirety.

TECHNICAL FIELD

The present disclosure in some embodiments relates to a charging gun conduit structure capable of easily positioning a charging gun for use with a high-speed battery charger of an electric vehicle to a charging gun connection point of the vehicle.

BACKGROUND

The statements in this section merely provide background information related to the present disclosure and do not necessarily constitute prior art.

The charging gun and cable of the fast charger for the electric vehicle may not be easy to handle. A heavy charging plug and thick cable are necessary to provide proper heat dissipation and electrical insulation in case of supplying large electric current ranging one to several hundred amperes. The typical charging gun connection in which an exposed cable is hung down from a single rotating rod can be difficult to handle for weaker drivers such as women or the elderly. With electric vehicles increasingly distributed, the operability of the fast charger needs to be improved.

SUMMARY

According to some embodiments, the present disclosure provides a charging gun conduit structure including a main post, a first conduit, a second conduit of an inverted L-shaped configuration, a third conduit, a fourth conduit, a charging gun, and a plurality of charging cables and one or more signal lines. The main post is configured to accommodate a main control system and erect from a ground in a first direction perpendicular to the ground. The first conduit is configured to be elongated and includes a first joint at one end, having a rotating axis in the first direction, and connected through the first joint to a top portion of the main post. The second conduit is configured to be in L-shape. The second conduit includes a second joint at one end, having a rotating axis in the first direction, and connected through the second joint to the other end of the first conduit. The other end of the second conduit is extended toward the ground. The third conduit is configured to be elongated and includes one end connected to the other end of the second conduit through a corrugated pipe formed to be retractable in a longitudinal direction. The fourth conduit includes a third joint at one end, having a rotating axis in a second direction, which is perpendicular to the first direction, and connected through the third joint to the other end of the third conduit. The charging gun has one end connected to the other end of the fourth conduit through an elastic connection unit formed of a flexible material to be bendable at an arbitrary angle within a predetermined range. The other end of the charging gun is configured to be inserted into a charging socket of an electric vehicle. The central axis of the charging gun extends substantially in parallel to the ground. The plurality of charging cables and the one or more signal lines are disposed inside the first conduit, the second conduit, the third conduit, and the fourth conduit and configured to connect the main control system with the charging gun electrically.

The second joint may include a hinge structure on both sides in the first direction to provide two hinges that allow the plurality of charging cables and the one or more signal lines to be disposed to be unconstrained between the two hinges.

The third joint may include a hinge structure on both sides in the second direction to provide two hinges that allow the plurality of charging cables and the one or more signal lines to be disposed to be unconstrained between the two hinges.

At least one of the four sides of the first conduit and the second conduit, adjacent to the second joint and parallel to the first direction, may include a first opening for allowing the plurality of charging cables and the one or more signal lines to extend outside of the first conduit and/or the second conduit when the second joint is folded or unfolded.

At least one of the four sides of the third conduit and the fourth conduit, adjacent to the third joint and parallel to the second direction, may include a second opening for allowing the plurality of charging cables and the one or more signal lines to extend outside the third conduit and/or the fourth conduit when the third joint is folded or unfolded.

The respective length of the first opening and the second opening along the longitudinal direction of the corresponding conduit is determined based on a minimum bendable radius of curvature of the plurality of charging cables.

The respective length of the first opening and the second opening along the longitudinal direction of the corresponding conduit is so determined as to allow the accommodated plurality of charging cables and the one or more signal lines to be freely bent and deformed into the minimum bendable radius of curvature without being restricted by the corresponding conduits, when the first and second conduits are folded 180 degrees or when the third and fourth conduits are folded 180 degrees.

The charging cables may each include a single conductor, a PVC corrugated pipe that wraps the single conductor, and metal bellows that wraps the PVC corrugated pipe.

The metal bellows may be formed to have a concave-convex structure externally in a repeated arrangement that extends in a longitudinal direction. The concave-convex structure may be configured to define a minimum radius of curvature of the metal bellows when bent, and the minimum radius of curvature defined by the concave-convex structure may be configured to be equal to or larger than a minimum radius of curvature of the single conductor.

The charging gun conduit structure may further include a magnet installed at one side of the third conduit or a backside of the charging gun opposite to a plug side for allowing a temporary folded up storage of the charging gun at the side of the third conduit.

The second joint and the third joint may have a rotation range from 0 to 180 degrees.

The first conduit may be formed to be longer than the elongated portion of the second conduit adjacent to the first conduit so that the charging gun is positioned near the main post and the storage volume of the charging gun conduit structure becomes minimum when the first and second conduits are folded away from an electric vehicle toward the main post.

The second conduit may be configured to have enough inner space for allowing the plurality of charging cables and the one or more signal lines to move up or down in the second conduit when the corrugated pipe is contracted or expanded.

The main control system may instead be installed on a superstructure of a parking stall, which includes a parking lot ceiling, and the first conduit may instead be formed in an L-shaped configuration having one end rotatably attached to the superstructure so that the other end of the first conduit is rotatable on a plane parallel to the ground.

The first conduit and the superstructure may be connected at a point that is disposed adjacent to the center of the parking stall.

The corrugated pipe may be disposed to connect the third conduit with the fourth conduit instead of being disposed between the second conduit and the third conduit. Herewith the third joint may be disposed to connect the second conduit with the third conduit instead of being disposed between the third conduit and the fourth conduit.

DETAILED DESCRIPTION

The electric vehicle charging cable is thick and heavy, so it is difficult to maneuver the charging cable from the storage position to the charging socket of the electric vehicle. The present disclosure in some embodiments seeks to provide a charging gun conduit structure that facilitates the easy maneuver of the charging gun by using charging conduits having a multi-joint structure enclosing a charging cable and a signal line. In particular, the present disclosure seeks to provide a charging gun conduit structure with reduced size and weight. By providing at least some open portions formed at the conduits adjacent to the joint, the cable may be allowed to be bent with a larger radius of curvature when the conduits are folded, making it possible to use smaller sized conduits.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order, or sequence of the components. Throughout this specification, when a part "includes" or "comprises" a component, the part is meant to further include other components, not excluding thereof unless there is a particular description contrary thereto. The terms such as "unit," "module," and the like refer to units for processing at least one function or operation, which may be implemented by hardware, software, or a combination thereof.

Figure 1:
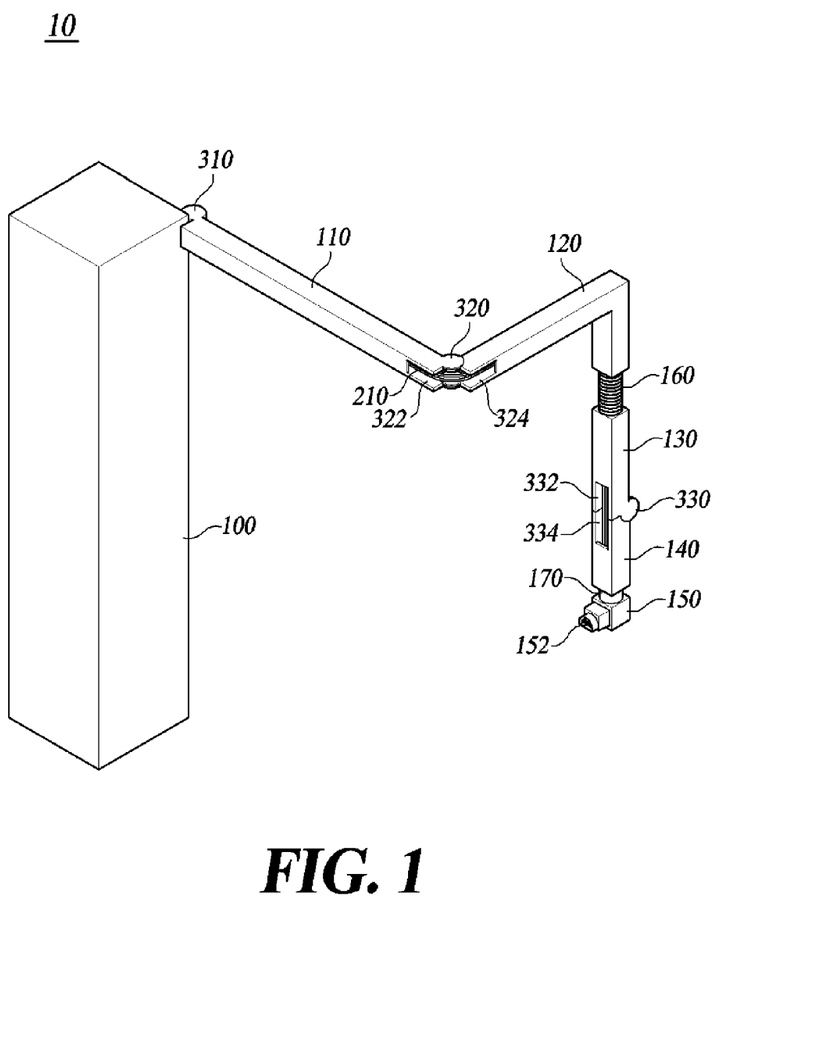
FIG. 1 is a perspective view of a charging gun conduit structure according to at least one embodiment of the present disclosure.

FIG. 1 is a perspective view of a charging gun conduit structure according to at least one embodiment of the present disclosure.

Figure 2:
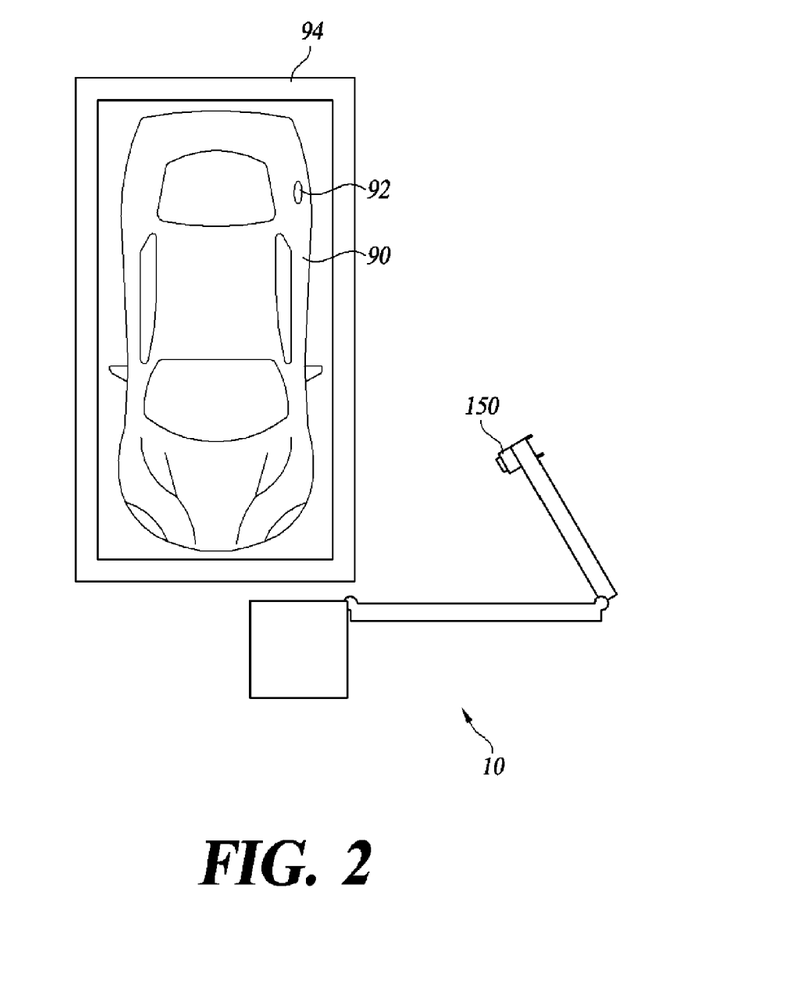
FIG. 2 illustrates an application of the charging gun conduit structure at a parking stall.

FIG. 2 illustrates an application of the charging gun conduit structure at a parking stall.

Compared to a typical vehicle with an internal combustion engine, an electric vehicle 90 takes time to charge. Usually, a driver brings the vehicle to a parking stall 94 and maneuvers charging cables 210 from a charging system installed on one side of the parking stall 94. Then, the driver inserts a charging gun 150 into latching engagement with a charging socket 92 of the vehicle to begin the charging session.

A fast charger may be used to shorten the charging time, and related products and technologies are being actively developed. For fast charging, a high current on the order of several hundred amperes flows through the charging cables 210. To reduce heat generated by high current and to secure insulation for safety, a very thick cable needs to be used.

An ordinary driver cannot easily maneuver such thick charging cables 210 only with muscle power or by relying on a rotating rod that moves across above the vehicle. The thickened charging cables 210 not only add the weight but also render the charging cables 210 to be inflexible and less bendable, resulting in poorer operability.

A charging gun conduit structure 10 according to at least one embodiment of the present disclosure provides a user with a link structure capable of overcoming the weight and low flexibility of such thick charging cables 210 for a fast charger by using conduits for accommodating the charging cables 210 and a proper multi-joint arrangement structure. At least one embodiment provides a link connection that is structured to have low frictional resistance due to rotation. In addition, the joints are each formed forwardly and rearwardly thereof with a plurality of openings for allowing the charging cables 210 to be expansively deformed outside the conduits, thereby enabling the conduits to be folded about the joints over the entire foldable angle range from zero up to as much as 180 degrees securely even with a relatively large minimum radius of curvature of the thick and rigid charging cables 210.

The charging gun conduit structure 10, according to at least one embodiment of the present disclosure, includes a main post 100, a first conduit 110, a second conduit 120, a third conduit 130, a fourth conduit 140, and the charging gun 150. The charging gun conduit structure 10 further includes multiple joints, which will be detailed below, including a first joint 310 for connecting the main post 100 with the first conduit 110, a second joint 320 for connecting the first conduit 110 with the second conduit 120, and a third joint 330 for connecting the third conduit 130 with the fourth conduit 140, as well as a corrugated pipe 160 for connecting the second conduit 120 with the third conduit 130 and an elastic connection unit 170 for connecting the fourth conduit 140 with the charging gun 150. The charging gun conduit structure 10 further includes a plurality of charging cables 210 and at least one or more signal lines (not shown) for making electrical connections from the main post 100 to the charging gun 150.

The main post 100 is installed on one side of the parking stall 94, accommodates a main control system (not shown), and is formed to protrude in a first direction perpendicular from the ground or surface of the parking stall 94. The charging gun conduit structure 10, according to at least one embodiment, is formed so that when folded and stored, it gets out of the way from the parking stall 94 and is positioned adjacent to the main post 100.

The first conduit 110 has one end connected to the top of the main post 100 through the first joint 310, having a rotating axis in a first direction.

The second conduit 120 has one end connected to the other end of the first conduit 110 through the second joint 320 having a rotating axis in the first direction, and it is formed of an L-shaped configuration. The L-shaped configuration of the second conduit 120 includes an elongated arm part which is connected to the second joint 320 and is preferably formed to be shorter than the length of the first conduit no. When the second conduit 120 is folded around the second joint 320 by 180 degrees so that one side of the second conduit 120 is in contact with the first conduit 110, a vertical arm part of the L-shaped configuration of the second conduit 120 which extends in the first direction or perpendicular to the ground is positioned outside the main post 100 without overlapping with the same. Preferably, the vertical arm part of the L-shaped configuration of the second conduit 120 may be disposed to be adjacent to the main post 100.

The third conduit 130 has one end connected to the other end of the vertical portion of the second conduit 120 through the corrugated pipe 160 formed to be retractable in the longitudinal direction, and it is likewise elongated.

The fourth conduit 140 has one end connected to the other end of the third conduit 130 through the third joint 330 having a rotating axis in a second direction, which is perpendicular to the first direction. FIG. 1 illustrates that the second direction is also perpendicular to the occupying plane of the L-shaped configuration of the second conduit 120.

The charging gun 150 has one end connected to the other end of the fourth conduit through the elastic connection unit 170 formed of an elastic material to be bendable at an arbitrary angle within a predetermined range. The charging gun 150 has the other end installed with a plug 152 configured to be inserted into the charging socket 92 of the electric vehicle 90 and renders its plug 152 to have the central axis extend near horizontally or substantially in parallel to the ground in consideration of the electric vehicle 90 having the charging socket 92 usually disposed to be laterally.

Inside the conduits, a plurality of charging cables 210 and one or more signal lines may pass through. The plurality of charging cables 210 may be disposed inside the first, second, third, and fourth conduits 110, 120, 130, and 140 to connect the main control system with the charging gun 150. One or more signal lines may be included in parallel for communicating control signals between the electric vehicle and the main control system.

Figure 3:
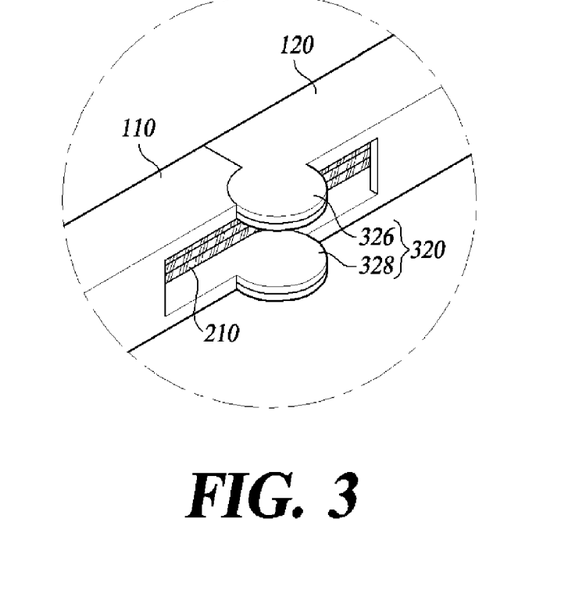
FIG. 3 illustrates a fully unfolded state of a second joint connecting a first conduit and a second conduit according to at least one embodiment of the present disclosure.

FIG. 3 illustrates a fully unfolded state of a second joint connecting a first conduit and a second conduit according to at least one embodiment of the present disclosure.

As shown in FIG. 3, the second joint 320 includes hinges 326 and 328 on both sides in the first direction, and it is configured to have a plurality of charging cables 210 and one or more signal lines placed unconstrained between the two hinges 326 and 328.

Figure 4:
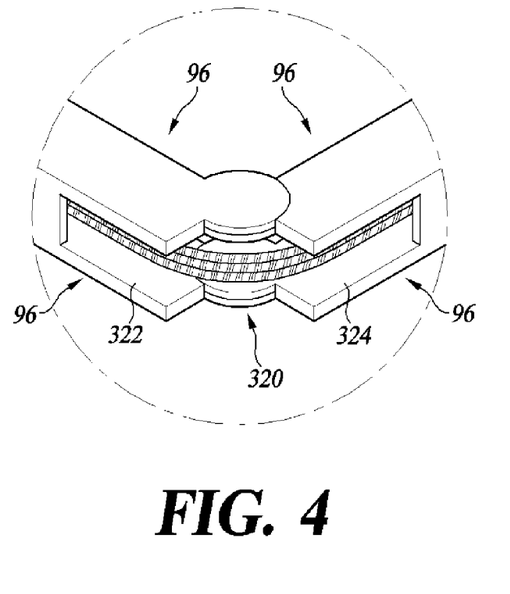
FIG. 4 illustrates a partially folded state of the second joint connecting the first conduit and the second conduit, according to at least one embodiment of the present disclosure.

FIG. 4 illustrates a partially folded state of the second joint connecting the first conduit and the second conduit, according to at least one embodiment of the present disclosure.

Each of the first conduit 110 and the second conduit 120 is configured to have first openings 322 and 324, adjacent to the second joint 320 on the surfaces parallel to the rotational axis of the second joint 320, providing at least partially open portions for the charging cables 210. When the second joint 320 is folded or unfolded, the plurality of charging cables 210 and one or more signal lines may extend outside of the first conduit 110 and the second conduit 120 through the plurality of first openings 322, 324.

The third conduit 130 and the fourth conduit 140 are also configured to have a plurality of second openings 332 and 334, adjacent to the third joint 330. When the third joint 330 is folded or unfolded, the plurality of charging cables 210 and one or more signal lines may extend outside of the third conduit 130 and the fourth conduit 140 through the plurality of second openings 332, 334.

Figure 5:
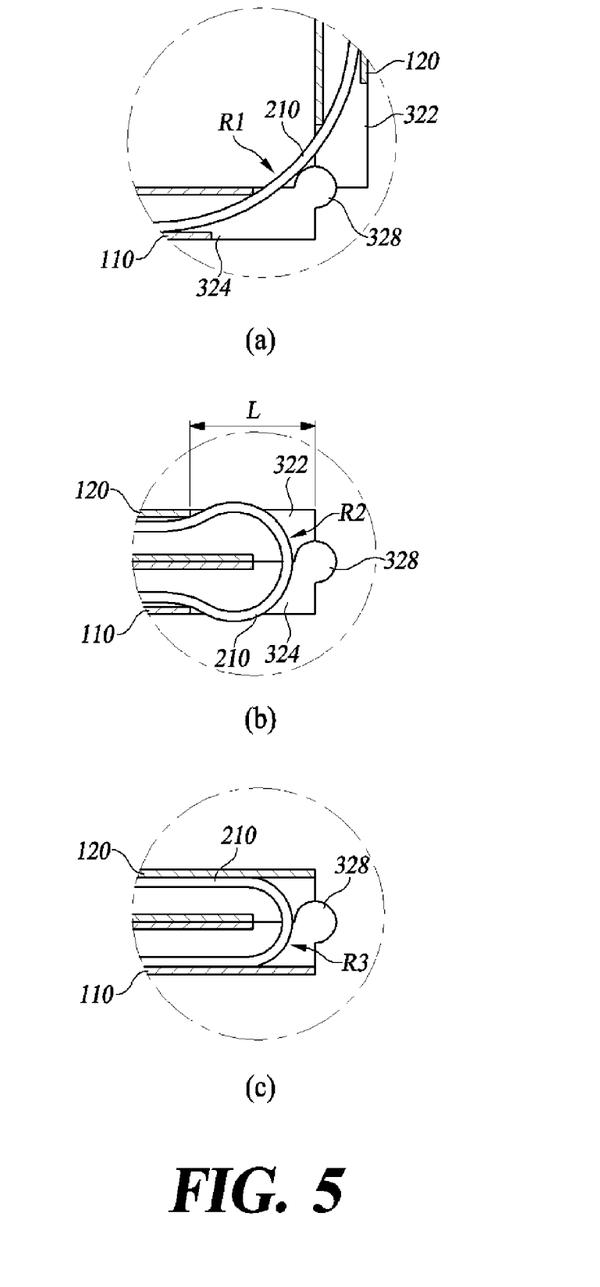
FIG. 5 illustrates the bending of charging cables as two conduits are folded at a joint and the increased minimum radius of curvature being affected by openings according to at least one embodiment of the present disclosure.

FIG. 5 illustrates the bending of charging cables as two conduits are folded at a joint and the increased minimum radius of curvature being affected by openings according to at least one embodiment of the present disclosure. FIG. 5 conceptually shows at (a) the first conduit 110 and the second conduit 120, including the first openings 322, 324 according to at least one embodiment of the present disclosure as being bent at an angle of 90 degrees around the second joint 320, in particular, the hinge 328. In this case, the radius of curvature of the bent charging cables 210 is illustrated as R1.

FIG. 5 shows at (b) the first openings 322, 324 according to at least one embodiment as incorporated in the first conduit 110 and the second conduit 120, which are bent at an angle of 180 degrees around the second joint 320. In at least one embodiment, the first conduit 110 and the second conduit 120, when folded, have the first openings 322 and 324 facing outward for allowing the charging cables 210 to extend outside of the first conduit no and the second conduit 120. The charging cables 210 shown in FIG. 5 at (b) are assumed to have a minimum bendable radius of the curvature of R2.

FIG. 5 illustrates at (c) a case without the first openings 322, 324 of the above-described concept from the first conduit 110 or the second conduit 120 where the first conduit no and the second conduit 120 are bent at an angle of 180 degrees around the second joint 320. When bent overriding their rigidity or the minimum bendable radius of curvature, the charging cables 210 would be unduly subject to a relatively small radius of curvature, e.g., R3, which may damage the charging cables 210 permanently.

As shown in FIG. 5 over the cases of (a) through (c), the first conduit 110 and the second conduit 120 are deemed to be bendable by the degree of about 90 degrees. In particular, FIG. 5 at cases (a) and (b) illustrates that the radii of curvature R1 and R2 are arranged to approximate realistic values, but FIG. 5 at case (c) lacking the openings 322, 324 illustrates that the radius of curvature R3 is smaller than the allowable radius of curvature of the charging cables 210. As a result, FIG. 5 at (c) shows an impractical degree of bending of the charging cables 210 according to at least one embodiment. Instead, the conduits desirably have the sides that are opened by a particular length or longer, for example, by at least a length L, as shown in FIG. 5 at (b) for bending the charging cables 210 with a larger radius of curvature, thereby allowing unrestricted 180-degree folding of the first conduit no and the second conduit 120. In at least one embodiment, the plurality of first openings 322, 324 formed in the first conduit 110 and the second conduit 120 and the second openings 332, 334 formed in the third conduit 130 and the fourth conduit 140 may commonly have length L that is determined in consideration of the stiffness and the corresponding minimum bendable radius of curvature of the charging cables 210 employed.

In summary, the first through fourth conduits 110, 120, 130, and 140 desirably provide the openings 322, 324, 332, and 334 with such length as determined not to restrict their accommodated charging cables 210 and one or more signal lines from being freely bent and deformed to have the minimum bendable radius of curvature.

Figure 6:
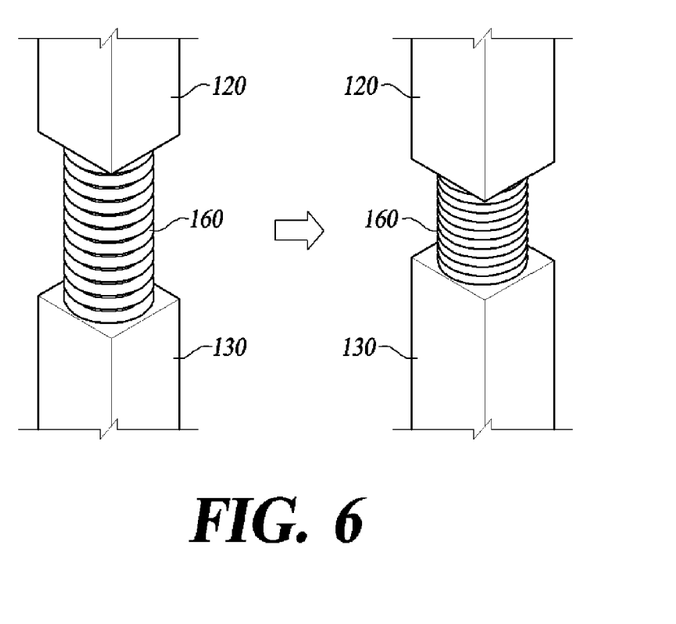
FIG. 6 illustrates a corrugated pipe connecting the second conduit and a third conduit according to at least one embodiment of the present disclosure.

FIG. 6 illustrates a corrugated pipe connecting the second conduit and a third conduit according to at least one embodiment of the present disclosure.

As shown in FIG. 6, the charging gun conduit structure 10, according to an embodiment, is configured to have the corrugated pipe 160 disposed between the other end of the second conduit 120 and the one end of the third conduit 130 to be vertically expanded or contracted to consequently adjust the elevation of the charging gun 150.

Figure 7:
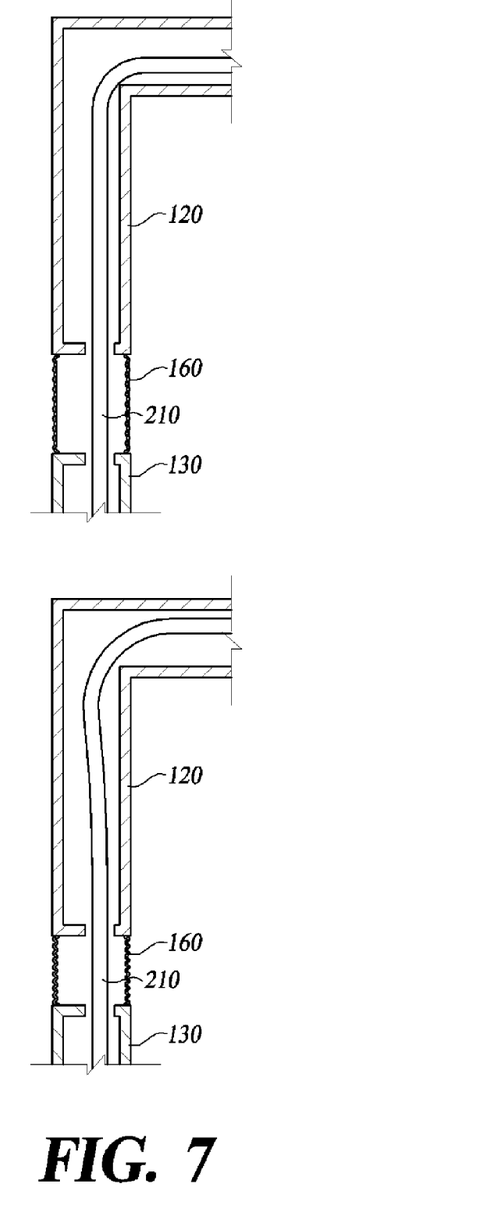
FIG. 7 illustrates the movement of the charging cables inside the second conduit by the expansion and contraction of the corrugated pipe capable of vertical movement according to at least one embodiment of the present disclosure.

FIG. 7 illustrates the movement of the charging cables inside the second conduit by the expansion and contraction of the corrugated pipe capable of vertical movement according to at least one embodiment of the present disclosure.

As shown in FIG. 7, when the corrugated pipe 160 is contracted, the third conduit 130 rises, and accordingly, the charging cables 210 disposed inside the second conduit 120 and the third conduit 130 rises. Accordingly, the second conduit 120 and the third conduit 130 are preferably formed to have an inner size that allows the rise of the charging cables 210.

Although not shown, to facilitate the rise of the charging cables 210 and offset the weight of the charging cables 210, a spring, including a coil spring, a leaf spring, etc., may be further disposed between the inner lower portion of the second conduit 120 and the charging cables 210.

Figure 8:
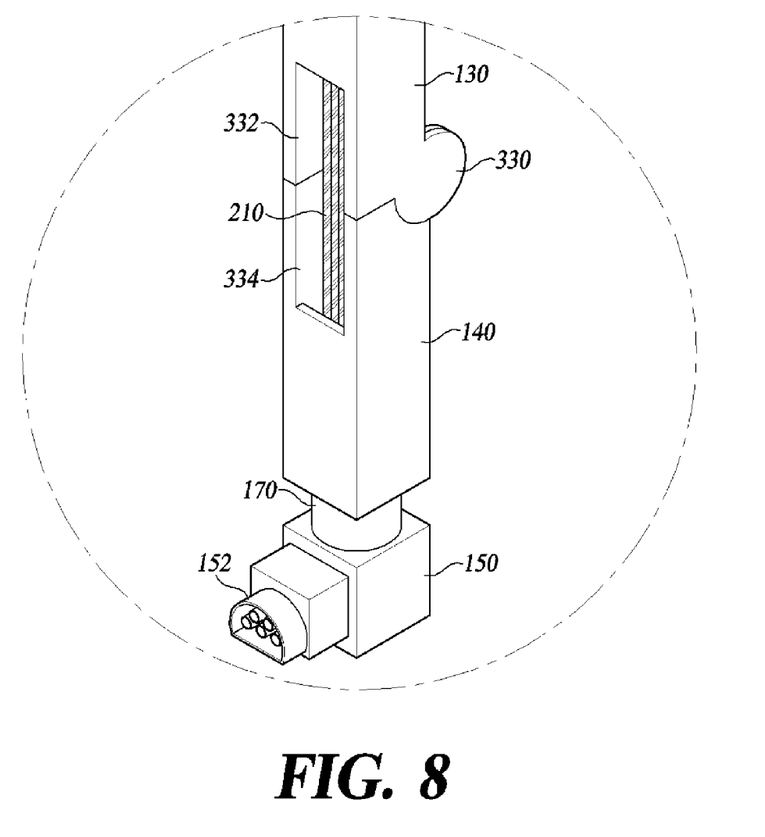
FIG. 8 illustrates the third joint connecting the third conduit and a fourth conduit, an elastic connection unit, and a charging gun according to at least one embodiment of the present disclosure.

FIG. 8 illustrates the third joint connecting the third conduit and a fourth conduit, an elastic connection unit, and a charging gun according to at least one embodiment of the present disclosure.

As shown in FIG. 8, the third joint 330 is employed similarly to the second joint 320. Like the second joint 320, the conduits about the third joint 330 include the second openings 332 and 334 having a length determined by taking account of the minimum radius of curvature of the charging cables 210.

On the other hand, the charging gun conduit structure 10, according to at least one embodiment, employs a structure including a plurality of conduits and joints to reduce the weight and smooth the motion thereof during movement. The jointed conduits may need an additional degree of freedom to be comparable to the usual form of charging installation involving cables simply hanging on top. The elastic connection unit 170 is introduced to give the charging gun 150 with an additional degree of freedom for angular adjustment. The elastic connection unit 170 may be formed of an elastic material and may be formed so that the charging cables 210 and the signal line pass therethrough. The elastic material may be made of a material such as silicone. The elastic connection unit 170 is formed to be elastically deformed within an angular range that can provide an angular tolerance for accommodating an angle variation that may exist in the orientation of the parked vehicle and the arrangement angle of the charging socket 92 into which the charging gun 150 is inserted.

The charging gun 150 may be disposed in a direction in which it does not interfere with the third conduit 130 when the fourth conduit 140 is folded 180 degrees.

Figure 9:
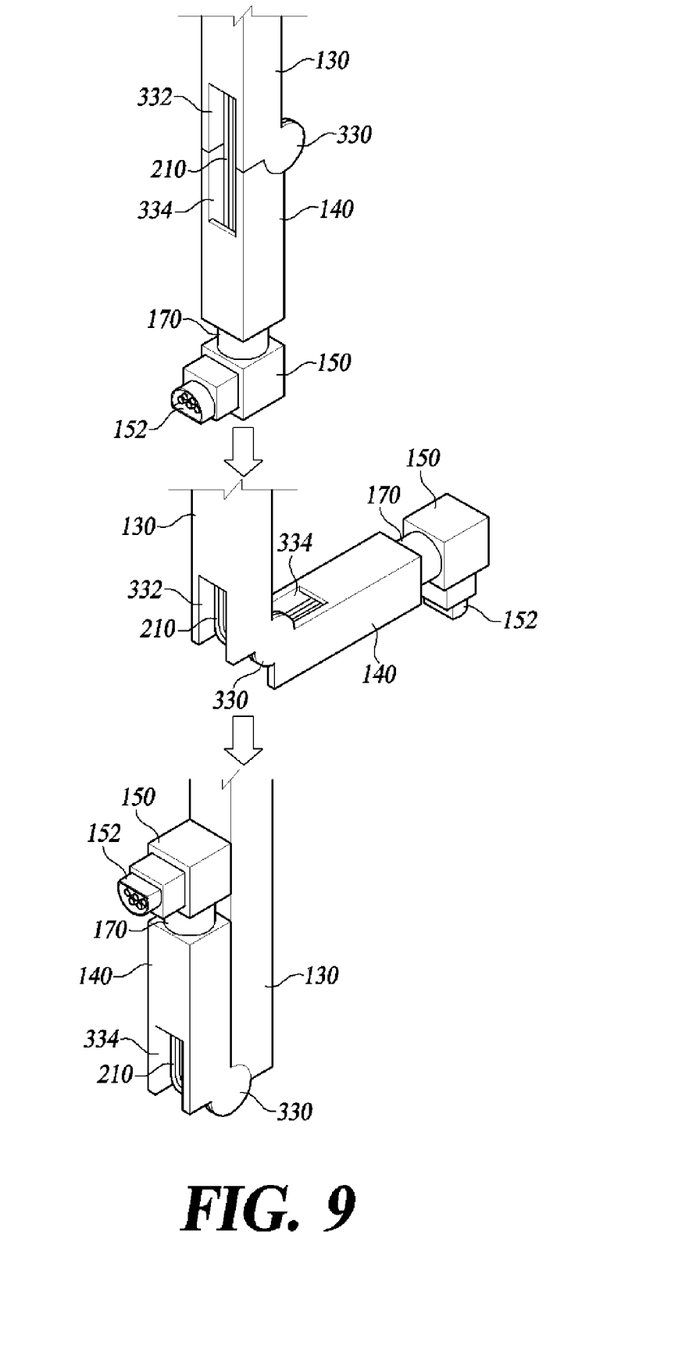
FIG. 9 illustrates the third joint in folding operation for the temporary storage of the fourth conduit, according to at least one embodiment of the present disclosure.

FIG. 9 illustrates the third joint in folding operation for the temporary storage of the fourth conduit, according to at least one embodiment of the present disclosure.

As shown in FIG. 9, the fourth conduit 140 may be folded around the third joint 330 so that one of the sides of the charging gun 150, which is opposite to its plug side for engaging the charging socket 92 comes in contact with the third conduit 130. In at least one embodiment, a magnet (not shown) may be provided in one or both of the abutting portions. Therefore, when the fourth conduit 140 is folded 180 degrees, it is temporarily fixed by the magnet so that the charging gun 150 can maintain its elevated position. When the user wants to deploy the charging gun 150, the magnetic force which is preset to an appropriate level may be overcome by the user pulling the charging gun 150 with a predetermined force or more to return the charging gun 150 to a lowered position.

Figure 10:
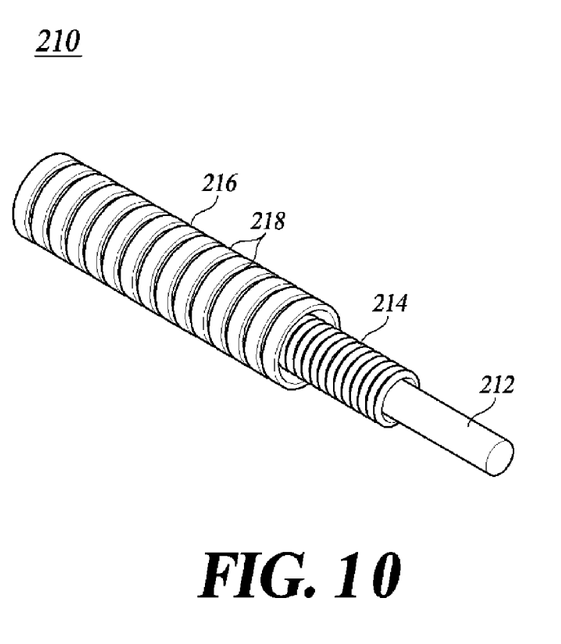
FIG. 10 illustrates the structure of a charging cable according to at least one embodiment of the present disclosure.

FIG. 10 illustrates the structure of a charging cable according to at least one embodiment of the present disclosure.

A charging cable 210, according to at least one embodiment, is configured to include a single conductor 212, a PVC corrugated pipe 214 disposed to surround the single conductor 212, and a metal bellows 216 disposed to surround the PVC corrugated pipe 214.

The metal bellows 216 may be formed to have an indented or concave-convex structure 218 externally in a repeated arrangement that extends in the longitudinal direction. The concave-convex structure 218 provides an arrangement with outer circumferential surfaces laterally touching adjacent ones when bending the charging cable 210 to stop the same from bending beyond a certain degree. In other words, the concave-convex structure 218 may define a minimum radius of curvature of the metal bellows 216 when bent. The minimum radius of curvature defined by the concave-convex structure 218 is determined to be equal or larger than that of the single conductor 212 that transmits a high current in the charging cable 210 to ensure that there is no mechanical deformation of that single conductor over repetitive use of folding or unfolding. Here, the minimum radius of curvature of the single conductor 212 is preferably defined to be within the elastic deformation limit of the conductor material.

Figure 11:
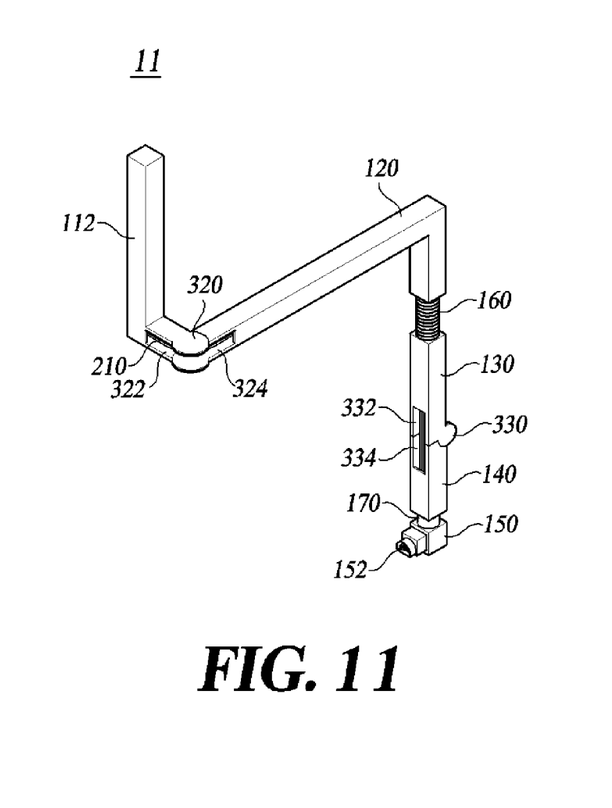
FIG. 11 is a perspective view of a charging gun conduit structure according to another embodiment of the present disclosure.

FIG. 11 is a perspective view of a charging gun conduit structure according to another embodiment of the present disclosure.

Figure 12:
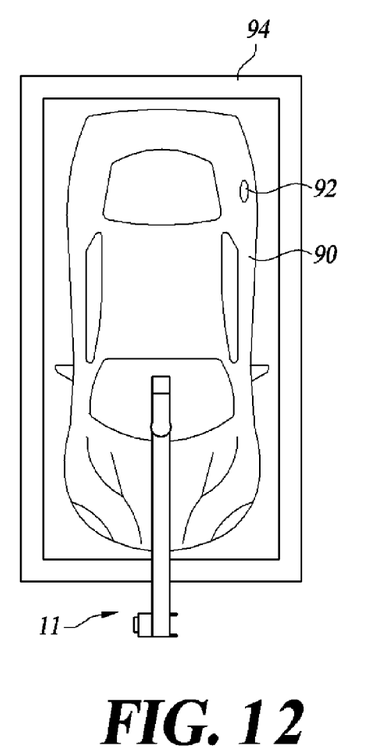
FIG. 12 is a plan view illustrating the embodiment of FIG. 11 as applied to a parking stall.

FIG. 12 is a plan view illustrating the embodiment of FIG. 11 as applied to a parking stall.

As shown in FIG. 11, a charging gun conduit structure 11 according to another embodiment, has a first conduit 112 formed in an L-shaped configuration for a case of installation where one end of the first conduit 112 is rotatably fixed right to a parking stall superstructure (not shown).

Different from a parking stall that is open to the air on top, an indoor parking space or an outdoor but roofed parking stall may not utilize the main post 100 as in the previous embodiment. The main control system may still be located in a lateral position of the parking stall 94, but may also be located on the superstructure within the parking stall 94. In this case, the charging gun conduit structure 11, according to the present embodiment, may be formed to be directly connected to the superstructure corresponding to the center of the parking stall 94.

The first conduit 112 may have one end rotatably connected to the superstructure, so that the first conduit 112 may be configured to rotate on a plane parallel to the ground. To this end, the superstructure may be provided with a base structure (not shown) configured to be latched thereto, which includes a rotating shaft supported by bearing elements so that the one end of the first conduit is rotatable by the base structure once attached to the superstructure. Therefore, the charging gun conduit structure 11, according to the present embodiment, allows the charging gun 150 to be easily plugged into the charging socket 92 regardless of the orientation of the parked vehicle in the parking stall 94.

In the present disclosure, the conduit structure has been described as including the first to fourth conduits, but the number of joints and conduits constituting the conduit structure, inclusive of the shape of the conduit, may be modified in a variety of forms based on the technical idea of the present disclosure. The conduit structure is not limited to the configurations, including the four conduits illustrated by some embodiments of the present disclosure.

For example, although not separately shown, the corrugated pipe 214 may be disposed to connect the third conduit 130 with the fourth conduit 140 instead of being disposed between the second conduit 120 and the third conduit 130. Accordingly, the third joint 330 may be disposed to connect the second conduit 120 with the third conduit 130 instead of being disposed between the third conduit 130 and the fourth conduit 140.

In the present disclosure, the charging conduits of the multi joint structure support the weight of the charging cable to provide a smooth movement, and the charging conduits have openings at some periphery portions of the joints so that the cables can be folded or unfolded with a large radius of curvature, thereby providing the conduits with a secure swivel angle and reduced size and weight.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A charging gun conduit structure, comprising:
    a main post configured to accommodate a main control system and erect from a ground in a first direction perpendicular to the ground;
    a first conduit configured to be elongated and including a first joint at one end having a rotating axis in the first direction and the one end connected through the first joint to a top portion of the main post;
    a second conduit of an L-shaped configuration including a second joint at one end having a rotating axis in the first direction, the one end connected to another end of the first conduit, and other end of the second conduit extending toward the ground;
    a third conduit configured to be elongated and including one end connected to the other end of the second conduit through a corrugated pipe formed to be retractable in a longitudinal direction;
    a fourth conduit including a third joint at one end, having a rotating axis extending in a second direction, which is perpendicular to the first direction, and connected through the third joint to another end of the third conduit;
    a charging gun having one end connected to another end of the fourth conduit through an elastic connection unit formed of an elastic material to be bendable at an arbitrary angle within a predetermined range, another end configured to be inserted into a charging socket of an electric vehicle, and a central axis extending substantially in parallel to the ground; and
    a plurality of charging cables and one or more signal lines which are disposed inside the first conduit, the second conduit, the third conduit, and the fourth conduit and configured to connect the main control system with the charging gun electrically.

2. The charging gun conduit structure of claim 1, wherein the second joint includes a hinge structure on both sides in the first direction to provide two hinges that allow the plurality of charging cables and the one or more signal lines to be disposed of unconstrained between the two hinges.

3. The charging gun conduit structure of claim 1, wherein the third joint includes a hinge structure on both sides in the second direction to provide two hinges that allow the plurality of charging cables and the one or more signal lines to be disposed of unconstrained between the two hinges.

4. The charging gun conduit structure of claim 2, wherein at least one of the four sides of the first conduit and the second conduit, adjacent to the second joint and parallel to the first direction, includes a first opening for allowing the plurality of charging cables and the one or more signal lines to extend outside of the first conduit and the second conduit when the second joint is folded or unfolded.

5. The charging gun conduit structure of claim 4, wherein at least one of the four sides of the third conduit and the fourth conduit, adjacent to the third joint and parallel to the second direction, includes a second opening for allowing the plurality of charging cables and the one or more signal lines to extend outside of the third conduit and the fourth conduit when the third joint is folded or unfolded.

6. The charging gun conduit structure of claim 4, wherein the respective length of the first opening and the second opening along the longitudinal direction of the corresponding conduit is determined based on a minimum bendable radius of curvature of the plurality of charging cables.

7. The charging gun conduit structure of claim 6, wherein the respective length of the first opening and the second opening along the longitudinal direction of the corresponding conduit is so determined as to allow the accommodated plurality of charging cables and the one or more signal lines to be freely bent and deformed into the minimum bendable radius of curvature without being restricted by the corresponding conduits, when the first and second conduits are folded 180 degrees or when the third and fourth conduits are folded 180 degrees.

8. The charging gun conduit structure of claim 5, wherein respective lengths of the first opening and the second opening along the longitudinal direction of a corresponding conduit is determined based on a minimum bendable radius of curvature of the plurality of charging cables.

9. The charging gun conduit structure of claim 8, wherein the respective lengths of the first opening and the second opening along the longitudinal direction of the corresponding conduit is so determined as to allow the accommodated plurality of charging cables and the one or more signal lines to be freely bent and deformed into the minimum bendable radius of curvature without being restricted by the corresponding conduits, when the first and second conduits are folded 180 degrees or when the third and fourth conduits are folded 180 degrees.

10. The charging gun conduit structure of claim 1, wherein the charging cables each comprise:
    a single conductor;
    a PVC corrugated pipe that is disposed to surround the single conductor; and
    a metal bellows that is disposed to surround the PVC corrugated pipe.

11. The charging gun conduit structure of claim 10, wherein
    the metal bellows is formed to have a concave-convex structure externally in a repeated arrangement that extends in a longitudinal direction,
    the concave-convex structure is configured to define a minimum radius of curvature of the metal bellows when bent, and
    the minimum radius of curvature defined by the concave-convex structure is configured to be equal to or larger than a minimum radius of curvature of the single conductor.

12. The charging gun conduit structure of claim 1, further comprising:
    a magnet installed at one side of the third conduit or backside of the charging gun, which is opposite to a plug side for allowing a temporarily folded up storage of the charging gun at the side of the third conduit.

13. The charging gun conduit structure of claim 1, wherein the second joint and the third joint have a rotation range from 0 to 180 degrees.

14. The charging gun conduit structure of claim 1, wherein the first conduit is formed to be longer than the elongated portion of the third conduit adjacent to the first conduit so that the charging gun is positioned near the main post and storage volume of the charging gun conduit structure becomes minimum when the first and second conduits are folded away from the electric vehicle toward the main post.

15. The charging gun conduit structure of claim 1, wherein the second conduit is configured to have enough inner space for allowing the plurality of charging cables and the one or more signal lines to move up or down in the second conduit when the corrugated pipe is contracted or expanded.

16. The charging gun conduit structure of claim 1, wherein
    the main control system is configured to be installed on a superstructure of a parking stall, which includes a parking lot ceiling, and
    the first conduit is formed in an L-shaped configuration, having one end rotatably attached to the superstructure so that the other end of the first conduit is rotatable on a plane parallel to the ground.

17. The charging gun conduit structure of claim 16, wherein the first conduit and the superstructure are connected at a point that is disposed adjacent to a center of the parking stall.

18. The charging gun conduit structure of claim 1, wherein the corrugated pipe is disposed to connect the third conduit with the fourth conduit instead of being disposed between the second conduit and the third conduit, and the third joint is disposed to connect the second conduit with the third conduit instead of being disposed between the third conduit and the fourth conduit.

* * * * *